UNITED STATES PATENT OFFICE.

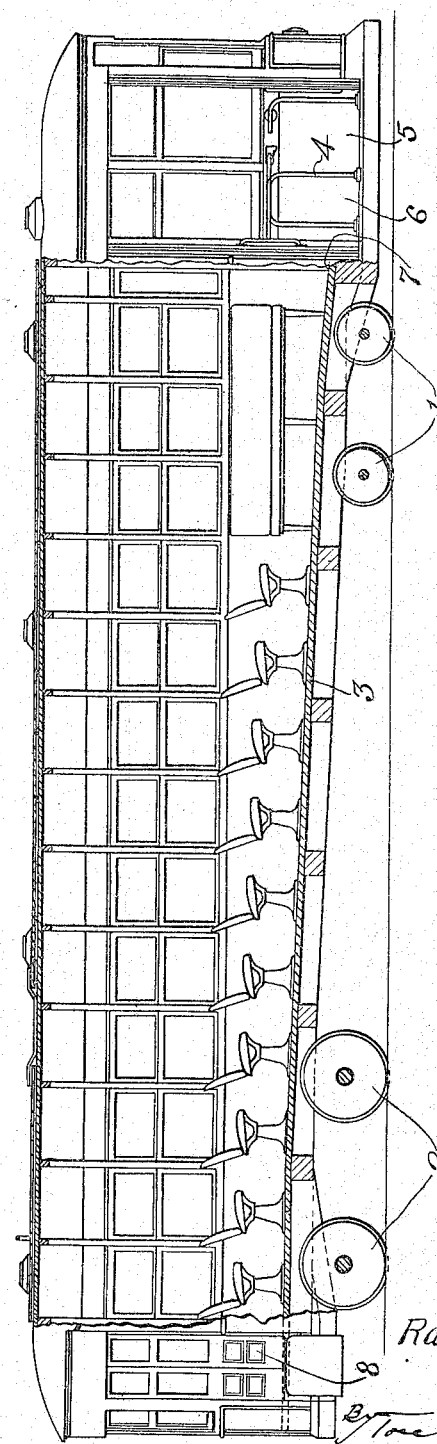

RALPH T. SENTER, OF PHILADELPHIA, PENNSYLVANIA, ASSIGNOR TO THE NEAR SIDE CAR COMPANY, OF NEW YORK, N. Y., A CORPORATION OF NEW YORK.

PASSENGER-VEHICLE.

1,130,026.   Specification of Letters Patent.   Patented Mar. 2, 1915.

Application filed November 4, 1912. Serial No. 729,270.

*To all whom it may concern:*

Be it known that I, RALPH T. SENTER, a citizen of the United States, residing at Philadelphia, in the county of Philadelphia and State of Pennsylvania, have invented certain new and useful Improvements in Passenger-Vehicles, of which the following is a specification, reference being had therein to the accompanying drawing.

This invention relates to passenger vehicles and more particularly to street cars.

The object of the invention is to provide a stepless car, that is, a car onto the floor of which a passenger can step directly from the street.

Heretofore one or more steps have been interposed between the platform and the street, this being made necessary by the height of the trucks, one of which at least must be high enough to support the motor and its coöperating mechanism.

To overcome these difficulties and provide a platform close to the track level it is a further object of the invention to so construct the car that the height of the truck at one end of the car can be reduced, the adjacent end of the car floor depressed and the car provided with both entrance and exit near the depressed end thereof.

The accompanying drawing is a longitudinal sectional view of a car embodying my invention, showing the end portions thereof in elevation.

In this drawing I have illustrated one embodiment of my invention and have shown the same as comprising a car having the front and rear trucks 1 and 2, respectively, of different heights, the rear trucks being of the usual height and adapted to support the motor and its coöperating mechanism. Inasmuch as the construction of this truck and the manner in which the mechanism is mounted thereon is well known and forms no part of the present invention I have not here shown the same but have shown the truck diagrammatically. The front truck, which is also shown diagrammatically, is of a height very much less than the rear truck and the floor 3 of the body portion of the car slopes from the pivot point of the rear truck to the pivot point of the front truck. A portion of the car floor, in the present instance the extreme forward portion, is depressed to bring its upper surface near the track level and at a height which will permit a passenger to step from the street directly onto the floor of the car, thus eliminating the intermediate step. This depressed portion of the car floor constitutes a platform and is divided by a barrier 4 into entrance and exit passageways 5 and 6, respectively, leading to the interior of the car. The depressed portion of the floor in the present embodiment of the invention communicates with the body portion thereof by a low step 7 and the floor slopes upwardly from this step to the pivot point of the forward truck and thence more gently to the pivot point of the rear truck and in the rear of the pivot point of the rear truck the floor is preferably level. In the present embodiment of the invention the floor for the entire width of the car slopes forwardly and the seats are placed upon the sloping portion thereof. In this manner I avoid the step or riser which would exist between the central aisle and the seat platforms if the central portion of the floor or aisle only were sloped and that portion of the floor carrying the seats retained in a horizontal position. The rear end of the car is normally closed but is provided with an emergency door 8 by means of which egress may be had in case the front doors become blocked or it is desired to discharge the entire car load of passengers at one time. But inasmuch as this door is used for emergency purposes only the fact that a step is necessary to reach from the ground to the floor of the car is immaterial. It will be noted, therefore, that by providing the car with the entrance and exit both at one end thereof and utilizing a low truck near that end of the car which has the entrance and exit I am enabled to depress a portion of the car floor to a level so close to the track level that it is an easy matter to step from the street onto the floor of the car.

While I have shown and described one embodiment of my invention it will be seen that this has been chosen for the purposes of illustration only and I wish it to be understood that I do not desire to be limited to the details of construction shown and described, for obvious modifications will occur to a person skilled in the art.

Having thus fully described my invention, what I claim as new and desire to secure by Letters Patent, is:—

1. In a car, a body portion having one end depressed below the level of the other end, a platform supported at the depressed end thereof near the track level and arranged to permit a passenger to step directly from the street to the platform.

2. In a car, a body portion having one end depressed below the level of the other end, a platform supported at the depressed end thereof near the track level, having both an entrance and an exit and arranged to permit a passenger to step directly onto or off of the platform of the car.

3. In a car, a body portion having one end depressed below the level of the other end, a platform supported at the depressed end thereof near the track level and arranged to permit a passenger to step directly from the street to the platform, and trucks of different heights to support the respective ends of the body portion of said car.

4. A car comprising two trucks, one of less height than the other, a body portion having its floor sloping from one truck to the other, and a platform at the lower end of said body portion arranged close to the track level.

5. A car comprising a body portion, high wheels supporting one end of said car, and low wheels supporting the other end thereof, said body portion having its floor sloping toward said low wheels and provided with a depressed portion arranged close to the track level, said car having both its entrance and its exit at the depressed portion of said floor.

6. A car comprising a body and trucks at the opposite ends of said body, one of said trucks being of less height than the other, a portion of said body adjacent to the lower truck being depressed to permit passengers to step directly onto and off of the floor thereof and being provided with both an entrance and an exit.

7. A double truck car having a high truck at the rear end thereof and a low truck at the front end thereof, a car body mounted on said trucks having its floor sloping toward said front trucks and provided at its front end with a depressed portion arranged close to the track level, said car body being normally closed at its rear end and having both an entrance and an exit at its front end.

8. A street car having a boarding and alighting entrance at its front end and within a single step distance from the ground, the floor level of the car being upwardly inclined from the front to the rear end of the car, and means for dividing said entrance into separate passageways.

9. A street car having a boarding and alighting entrance at one end within a single step distance from the ground, the floor of the car being inclined upwardly from the entrance to the other end of the car, and means arranged inside said entrance to divide the space thereof into separate passages.

10. A street car having a boarding and alighting entrance at one end, a pair of trucks for supporting said car, the truck at the boarding and alighting end of the car having wheels of small diameter, the truck at the opposite end of the car having wheels of large diameter, the entrance being within a single step distance of the ground, the floor of the car being inclined upwardly from the entrance and extending over the truck at the far end of the car.

11. A semi-stepless car including a car body having a floor, a supporting truck therefor having wheels of reduced diameter, a landing platform at the end of the car body beyond the trucks and arranged within a single step distance from the car body floor, the car body floor being inclined from the platform into the car body and over the truck, and means for supporting the floor of the landing platform within a single step distance from the ground.

12. A semi-stepless car including a car body having a floor upwardly inclined from the end thereof, a supporting truck for said body, said truck having wheels of reduced diameter, a landing platform located at the end of the inclined floor of the car body, and means carried by the car body for supporting the floor of said landing platform a single step distance from the car body floor and from the ground.

In testimony whereof, I affix my signature in presence of two witnesses.

RALPH T. SENTER.

Witnesses:
JESSIE M. IRWIN,
JOHN S. WURTS.

Copies of this patent may be obtained for five cents each, by addressing the "Commissioner of Patents, Washington, D. C."